United States Patent [19]

Cahalan et al.

[11] 4,053,699
[45] Oct. 11, 1977

[54] FLASH DRYING OF XANTHAN GUM AND PRODUCT PRODUCED THEREBY

[75] Inventors: Patrick Thomas Cahalan, Champlin; John Allen Peterson, Coon Rapids; Douglas Arthur Arndt, Champlin, all of Minn.

[73] Assignee: General Mills Chemicals, Inc., Minneapolis, Minn.

[21] Appl. No.: 672,187

[22] Filed: Mar. 31, 1976

[51] Int. Cl.² ............................................. C08B 37/00
[52] U.S. Cl. .............................. 536/114; 252/8.5 C; 252/55
[58] Field of Search .......................................... 536/114

[56] References Cited

U.S. PATENT DOCUMENTS

| 2,950,195 | 8/1960 | Hodgins et al. | 536/114 |
| 3,042,668 | 7/1962 | Monti et al. | 536/114 |
| 3,080,355 | 3/1963 | Muller | 536/114 |
| 3,455,899 | 7/1969 | Keen | 536/114 |
| 3,679,658 | 7/1972 | Yueh et al. | 536/114 |
| 3,712,883 | 1/1973 | Nordgren | 536/114 |

Primary Examiner—Johnnie R. Brown
Attorney, Agent, or Firm—Gene O. Enockson; Patrick J. Span; Elizabeth Tweedy

[57] ABSTRACT

Flash dried granules of calcium-xanthomonas gum complex.

3 Claims, No Drawings

FLASH DRYING OF XANTHAN GUM AND PRODUCT PRODUCED THEREBY

STATEMENT OF THE INVENTION

This invention relates to granules of a calcium-xanthomonas gum complex which hydrates rapidly in brine and a method for making the granules.

BACKGROUND OF THE INVENTION

Xanthomonas gum is produced in a broth by fermentation. Upon completion of the fermentation the gum can be recovered from the broth by using one of several precipitating agents. One precipitating agent is an alcohol usually isopropyl alcohol. Another precipitating agent is a quaternary compound. Still another precipitating agent is the calcium ion combined with an alkaline pH. When the precipitation is conducted with the calcuim ion the type of calcium-xanthomonas gum complex which is useful in the practice of this invention is formed. Heretofore the calcium-xanthomonas gum complex was subsequently oven dried at a temperature of about 100° C. to 145° C. over a period of about 20 to 30 minutes. It is also known that xanthomonas gum precipitated by other means can be hydrated and susequently precipitated with the calcium ion at an alkaline pH to produce the type of calcium-xanthomonas gum complex useful in the practice of the invention.

Aqueous sols of calcium-xanthomonas gum complexes are plastic in nature and exhibit relatively high viscosities and gel strengths when compared with sols of other gums. These features have made xanthomonas gum an important commercial gum. The oven dried calcium-xanthomonas complex, however, is slowly rehydratable in water and does not rehydrate in brines. Its lack of rehydratability in brine has been a limitation to its usefulness in oil well drilling where thickeners and suspending agents are used to suspend cuttings and in fracturing earth strata where thickeners and suspending agents are used to suspend proppants.

SUMMARY OF THE INVENTION

It has now been found that calcium-xanthomonas gum complexes when flash dried exhibits improved rehydratability in water and also rehydrates in brine. Because of their rehydratability in brine they are useful in oil well drilling and earth fracturing operations.

The calcium-xanthomonas gum complex useful in the practice of this invention can be xanthomonas gum recovered from a broth by precipitation with the calcium ion or gum which had been previously precipitated from the broth with alcohol or some other precipitating agent and oven dried and subsequently rehydrated in water and then precipitated with the calcium ion.

The flash drying process comprises the steps of (1) adjusting the moisture content of the complex to about 70 to 80% by weight of the complex, (2) forming the physical shape of the complex material so that a large amount of surface is present in respect to the weight of the complex and (3) introducing the thus shaped complex material into a heated air stream thereby reducing the moisture content of the complex material to about 12% or below by weight of the total composition during a period of about 30 seconds or less and preferably in less than 15 seconds.

The method of adjusting the initial moisture content can be accomplished by several alternate routes. For example, after precipitation from the fermentation broth with the calcium ion, the calcium-xanthomonas gum complex can be centrifuged to remove sufficient water to produce a moisture content of about 70 to 80% by weight based on the weight of the complex. Alternatively, the complex can be oven dried and reydrated to the desired moisture level. Still another method is to hydrate a gum originally precipitated from the broth with a precipitating agent other than the calcium ion and reprecipitate the gum with the calcium ion at an alkaline pH and thereafter adjust the moisture content as described above.

The shaping step can be carried out by any means which results in a configuration wherein the exposed surface to weight is large. One method of shaping is to pass the calcium-xanthomonas gum complex through flaker rolls to produce a thin sheet. Another method is to hammer mill the material into a finely divided mass.

Once shaped, the comples is introduced into a stream of heated air having a temperature of about 70° to 250° C. Good results were obtained when the solids load in the stream was about one pound per 1500 to 2500 cubic feet per minute of air. The temperature and the load are so adjusted that the drying period required to produce a moisture content of about 12% by weight of the complex is about 30 seconds or less.

The hydratability of the complex is illustrated below in the Examples by its hydration in American Petroleum Industry brine which is an aqueous solution of 8.0% sodium chloride and 2.5% calcium chloride both by weight of the solution. Complexes dried slowly as in ovens does not rehydrate in this brine.

While the exact nature of the difference in the oven dried and flash dried gums is unknown, it is believed that during oven drying the complex granules collapse and that no collapse occurs during very quick drying. It is further believed that collapsed granules do not readily hydrate and that intact complex granules do readily hydrate.

DETAILS OF THE INVENTION

Xanthomonas gum is a fermentation product produced by the action of the bacteria *Xanthomonas Campestris* upon carbohydrates. Carbohydrates useful in the reaction include simple sugars, such as glucose and fructose, sucrose, starch and starch hydrolyzates. The reaction is carried out in the presence of selected minerals including phosphate and magnesium ions and a nitrogen source, usually a protein. The reaction is conducted in a pH range of from 6.5 to 7.5, preferably 7, and in a temperature range of from 28° to 30° C. Preferably the pH of the broth is controlled by metering into the mixture either an acid or base as required. In general, the commerial process involves growing the bacteria, inoculating a small batch of fermentable broth with the bacteria, allowing the small batch to ferment, inoculating a large batch of fermentable broth with the previously fermented small batch of broth, allowing the large batch to ferment, sterilizing the broth and finally recovering the xanthomonas gum from the broth.

The fermentation has been carried out by the following typical procedure. In the first step the bacteria was grown on an agar slant. In the second step bacteria from the slant was used to inoculate 2 liter aliquots of a fermentable broth containing per liter: glucose, 20 grams; $Na_2HPO_4.7H_2O$, 1.24 grams; $MgSO_4.7H_2O$, 0.25 grams; distillers dry solids, 8 grams. This second step broth was incubated for a period of 31 hours at a temperature of about 28° to 30° C. In the third step the broth was used to inoculate a 15 liter batch containing the same broth composition. The broth of the third step was allowed to ferment for a period of 29 hours at a temperature of about 28° to 30° C. The broth from the third step was used to inoculate a 15,000 liter batch of broth having the composition per liter of broth of: sucrose,20 grams; cooked soy meal dispersion, 6 grams; rapeseed oil, 0.65 gram; sulfuric acid, 0.53 gram; MgSO4.7H2O, 0.25 gram; Na2HPO4.12H2O, 15 grams and tap water. The final batch was allowed to ferment for a period of about 72 hours at a temperature of about 28° to 30° C. At the end of the final fermentation period the broth was steam sterilized to destroy all the viable microorganisms. The pH of the broth was then adjusted to 7.9 by the addition of potassium hydroxide and the gum was recovered from the broth.

In the above fermentation procedure a phosphate ion is essential for the growth of the bacteria. When the gum is to be recovered from the broth by precipitation with a calcium ion it is preferable to use as little phosphate ion as possible. The phosphate ions act as buffers and when the broth is later made alkaline their presence in larger amounts may necessitate adding impractical amounts of alkali. Different magnesium salts can be used. Xanthomonas gum contains glucuronic acid groups and when the gum is made as described above, one half to three fourths of these groups are neutralized with sodium ions and the remainder with potassium ions. When potassium salts rather than sodium salts are used in the preparation of the gum, this ratio is reversed. Other modifications such as using different nitrogen sources, different selection of potassium and sodium ions, and different acids can be made. In general, such modifications will within ±5 percent of the above amount of the critical ingredients.

Once formed, the broth contains gum, residues of the chemicals, unconverted sugars, cell walls of the xanthomonas bacteria. The gum can be separated from the broth by precipitating with a calcium ion at an alkaline pH. The fermentation process, calcium precipitation process or centrifuging process is not part of the present invention.

The present invention is directed toward subjecting the calcium-xanthomonas complex having a moisture content of from about 70 to 80% water by weight of weight of the complex to rapid drying and thereby reducing its moisture content to about 12% water by weight of the combination or below. In the most preferred embodiment of the invention, after the fermentation, the gum is precipitated from the broth by adding a calcium salt and raising the pH to about 11.5 to 13. Optimum results were obtained when a ratio of about 5 moles to 9 moles of calcium chloride to one mole of xanthomonas gum was used for precipitation and the pH was raised by metering sodium hydroxide into the broth. Generally, about 4 to 7 grams of sodium hydroxide to one liter of broth is used when about two grams of sodium phosphate per liter of broth was used in the fermentation. When larger amounts of phosphate ions are present greater amounts of alkali will be necessary to raise the pH. The precipitate is then centrifuged until the precipitate contains from about 70 to 75% water by weight of the precipitate. The precipitate is then passed through a shaping mechanism such as a hammer mill or flaking roll and introduced directly into a flash drying loop of heated air having a temperaure of about 70° to 250° C. Good results were obtained when flaking rolls having a blow back temperature of about 50° to 125° C. were used. The moisture content of the precipitate is reduced to less than 12% water by weight by flash drying in a time period preferably less than about 15 seconds.

Below are set specific illustrations of the advantages and benefits obtained from the present invention.

EXAMPLE I

A fermentation broth containing xanthomonas gum was prepared as described above. The broth contained 1.6% gum by weight determined by alcohol precipitation. The xanthomonas gum was precipitated from the broth by adding 1.28 grams of calcium chloride to 100 grams broth and the pH of the resulting mixture was then adjusted to about 12 with sodium hydroxide. (This used 8 moles of CaCl2/mole of gum or 0.8 gram of $CaCl_2$/gram of gum). Note: (Material does not precipate until pH is adjusted.) The precipitated calcium-xanthomonas gum complex was then centrifuged to a moisture content of 73.4% water by weight. The precipitate was divided into two samples. One sample was passed through flaking rolls having a pressure of 200 psi between them at a temperature of about 125° C. The sample was then flash dried to a moisture content of 9.6% in air having an inlet temperature of about 205° C. and an exit temperature of about 80° C. during period of 12 sec. The second sample was dried in an oven at a temperatue of 60° C., over a period of 1 hour to a moisture content of slightly less than 10% water by weight. The hydratability of the dried calcium-xanthomonas gum complex was them measured by placing 4.65 grams of the complex into American Petroleum Industry brine at a pH of 9, making a total of 500 grams of sol, applying continuous stirring and at specified intervals measuring the developed viscosity with a Fann Viscometer Model 35 using a 1/5 pound spring. Using the speeds indicated below, all viscosity measurements were made at a temperature of 25° C. ±0.5° C. The results are shown in Table 1.

TABLE 1

| VISCOSITY MEASUREMENTS (Centipoise) | | | |
|---|---|---|---|
| Time Period | 15 min. | 2 hrs. | 24 hrs. |
| Flash Dried Sample | | | |
| 600/rpm | 20.3 | 26.2 | 31.0 |
| 300/rpm | 28.0 | 38.6 | 47.0 |
| 3/rpm | 420.0 | 720.0 | 1150.0 |
| Oven Dried Sample | | | |
| 600/rpm | * | * | * |
| 300/rpm | * | * | * |
| 3/rpm | * | * | * |

*The complex did not hydrate. When stirring was stopped, the complex dropped out of the suspension.

EXAMPLE II

To further illustrate the effect of flash drying upon calcium-xanthomonas gum complexes a commercially sold xanthomonas gum fermented as described above, precipitated with isopropyl alcohol, sold under the Trademark XB-23(SC R)xanthan gum by General Mills Chemicals, Inc. was rehydrated in water and precipitated as described.

The sol was rehydrated to contain 1.75% gum in water. To the sol was added 2.625 grams of 40% CaCl2 solution per 100 grams of broth or 1.05 grams of CaCl2 per 100 mole of gum or 0.6 gram of CaCl2 per gram of gum. The precipitation was carried out at 60° C. The precipitate was then centrifuged to a moisture content of about 73.0% water by weight. One sample of the calcium-xanthomonas gum complex was flash dried as described above and a second sample of the complex was oven dried as described.

The flash dried material and the oven dried were dried to 8.0% moisture. Again we dissolved 4.65 grams of each into API brine to make 500 grams of sol at a pH of 9 of each product.

The hydration of the samples as well as a sample of the original gum which had not been reprecipitated with a calcium ion were measured as described above. The results are shown in Table 2.

TABL 2

| VISCOSITY MEASUREMENTS (Centipoise) | | |
| --- | --- | --- |
| Time Period | 15 min. | 24 hrs. |
| Flash Dried Sample | | |
| 600/rpm | 42.2 | 41.5 |
| 300/rpm | 67.0 | 67.0 |
| 3/rpm | 2000.0 | 2250.0 |
| Gel | — | 34.5 |
| Oven Dried Sample | | |
| 600/rpm | 34.0 | 36.0 |
| 300/rpm | 60.0 | 58.0 |
| 3/rpm | 980.0 | 1850.0 |
| Gel | — | 31.0 |
| Original Gum Sample | | |
| 600/rpm | 22.5 | 28.0 |
| 300/rpm | 33.0 | 43.5 |
| 3/rpm | 750.0 | 1200.0 |
| Gel | — | 15.0 |

EXAMPLE III

The precipitation was carried out exactly as in Example II. The precipitate was centrifuged to 73.0% moisture content. One sample of the calcium-xanthomonas complex was flash dried and a second of the comlex was oven dried. However, the flash dried mateial was passed through a hammer mill followed by a heated air loop. The inlet air temperature to the loop was 175° F. and the exit air temperature from the loop was 150° F. The hot air also passed through the hammer mill. Residence time of the produce in the loop is 8 seconds. Although this flash drying system is different than the previous two examples, it accomplishes the same thing. The hammer mill, as does the flaking rolls, exposes a large amount of surface area of the product, which enables it to be dried quickly to the heated air. The material was dried to 11.3% moisture in the flash dryer. The second sample was dried to about 8% moisture in the oven during a period of one hour at a temperature of 60° C. The samples were evaluated by putting 4.86 grams of flash dried product into API brine at a pH of 9 to make 500 grams of sol and 4.65 grams of oven dried product into the same API brine to make a similar sol. The products are added to the API brine on a moisture free basis therefore slightly more flash dried material was used than the oven dried material.

The viscosity results are shown in Table 3 along with the original starting XB-23® xanthan gum used to make the rehydration for calcium precipitation.

TABLE 3

| VISCOSITY MEASUREMENTS (Centipoise) | | |
| --- | --- | --- |
| Time Period | 15 min. | 24 hrs. |
| Flash Dried Sample | | |
| 600/rpm | 36.2 | 39.0 |
| 300/rpm | 56.5 | 63.0 |
| 3/rpm | 1400.0 | 1950.0 |
| Gel | — | 27.5 |
| Oven Dried Sample | | |
| 600/rpm | 12.9 | 30.0 |
| 300/rpm | 16.0 | 46.8 |
| 3/rpm | 120.0 | 830.0 |
| Gel | — | 9.4 |
| Original Gum Sample | | |
| 600/rpm | 22.5 | 28.0 |
| 300/rpm | 33.0 | 43.5 |
| 3/rpm | 750.0 | 1200.0 |
| Gel | — | 15.0 |

The embodiments of the invention in which an exclusive property or privilege is claimed are defined as follows:

1. In a method of making calcium-xanthomonas gum complex granules comprising the steps of precipitating xanthomonas gum with calcium ion at an alkaline pH to form a complex, adjusting the moisture content of the complex to from 70 to 80% by weight of the complex, the improvement consisting of flash drying the complex at an air temperature of 70° C to 250° C to a moisture content of no more than 12% by weight in a period of about no more than 30 seconds.

2. The method of claim 1 in which the calcium ion precipitates the xanthomonas gum at a pH of 11.5 to 13.

3. The product prepared by the method of claim 1.

* * * * *

UNITED STATES PATENT AND TRADEMARK OFFICE
CERTIFICATE OF CORRECTION

PATENT NO. : 4,053,699

DATED : October 11, 1977

INVENTOR(S) : Patrick Thomas Cahalan, John Allen Peterson, Douglas Arthur Arndt

It is certified that error appears in the above-identified patent and that said Letters Patent are hereby corrected as shown below:

Col. 1, line 28, "the invention" should read - this invention -

Col. 2, line 19, "comples" should read - complex -

Col. 2, line 54, "commerial" should read - commercial -

Col. 3, line 35, after "will" insert - be -

Col. 3, line 47, "weight of" should be deleted

Col. 4, line 17, "CaCl2" should read - $CaCl_2$ -

Col. 4, line 60, "(SC R)" should read - ® -

Col. 4, lines 64, 65, 66, "CaCl2" should read - $CaCl_2$ -

Col. 4, line 66, after "100" should be inserted - grams of broth. This coincides with 6 moles of $CaCl_2$ per -

Col. 5, line 36, after "second" should be inserted - sample -

Col. 5, line 42, "produce" should read - product -

Signed and Sealed this

Twenty-first Day of February 1978

[SEAL]

Attest:

RUTH C. MASON
*Attesting Officer*

LUTRELLE F. PARKER
*Acting Commissioner of Patents and Trademarks*